United States Patent [19]
Furuya et al.

[11] Patent Number: 5,363,411
[45] Date of Patent: Nov. 8, 1994

[54] LOW POWER CONSUMPTION RECEIVER WITH ADAPTIVE EQUALIZER

[75] Inventors: Yukitsuna Furuya; Kazuhiro Okanoue; Akihisa Ushirokawa; Hideho Tomita, all of Tokyo, Japan

[73] Assignee: NEC Corporation, Japan

[21] Appl. No.: 902,383

[22] Filed: Jun. 23, 1992

[30] Foreign Application Priority Data

Jun. 27, 1991 [JP] Japan .................. 3-155042

[51] Int. Cl.$^5$ ............... H03H 7/30; H03H 7/40; H03K 5/159; H03G 11/04
[52] U.S. Cl. ............................. 375/75; 333/18; 375/11
[58] Field of Search ............ 375/11, 12, 13, 14, 375/15, 16, 75; 333/18; 364/724.19, 724.20; 455/343

[56] References Cited

U.S. PATENT DOCUMENTS

| | | | |
|---|---|---|---|
| 4,718,073 | 1/1988 | Takaoka | 375/14 |
| 5,136,617 | 8/1992 | Stenard | 375/108 |
| 5,195,106 | 3/1993 | Kazecki et al. | 375/12 |
| 5,212,803 | 5/1993 | Uddenfeldt et al. | 375/12 |

Primary Examiner—Stephen Chin
Assistant Examiner—Duane Kobayashi
Attorney, Agent, or Firm—Ostrolenk, Faber, Gerb & Soffen

[57] ABSTRACT

A receiver for digital radio communications has an equalizer which is powered off for reduced power consumption when received radio waves undergo relatively small intersymbol interference. When intersymbol interference is significantly large, the equalizer is powered on to remove the intersymbol interference for better signal reception. The receiver has a signal quality decision circuit which powers on the equalizer when the quality of the received signal is poor, and powers off the equalizer when the quality of the received signal is good. The receiver consumes a relatively small amount of electric power overall.

7 Claims, 6 Drawing Sheets

LOW POWER CONSUMPTION RECEIVER WITH ADAPTIVE EQUALIZER

BACKGROUND OF THE INVENTION

1. Field of the Invention

The present invention relates to a receiver for digital radio communications, and more particularly to a receiver for digital mobile radio communication.

2. Description of the Related Art

Digital mobile radio communication demand elimination of multipath fading that occurs due to the reception of radio waves reflected by different objects including surrounding topographic features, buildings, structures, etc. Actually, the reflected radio waves received by a receiver rarely suffer large differences in arrival time. If, however, reflected radio waves arrive at a receiver with substantially different time delays, then they are subject to waveform distortion. Adaptive equalization has been proposed to compensate for such waveform distortion.

There has been a demand for the addition of an adaptive equalizer to an ordinary demodulator in a receiver for digital mobile radio communication. The adaptive equalizer comprises a digital signal processor because it requires highly complex signal processing for adaptive equalization. One example of such an adaptive equalizer is described in detail in the article "Designing of Adaptive Maximum Likelihood Series Estimator And Its Characteristics Under Selective Fading", by Kubo, Murakami and Fujino, page 391, Collected Lecture Papers No. 2, National Spring Conference of Electronic Communications Society, published in 1991. However, that adaptive equalizer employing a digital signal processor requires a large amount of power consumption and hence does not lend itself to being incorporated in a portable receiver.

SUMMARY OF THE INVENTION

It is an object of the present invention to provide a receiver for digital mobile radio communication which consumes a relatively small amount of electric power and can be adapted for equalization when required.

According to the present invention, there is provided a receiver for digital radio communications, comprising demodulating means for demodulating a received signal, decision means for determining the quality of the modulated signal, equalizing means for equalizing the demodulated signal when the quality of the demodulated signal is lower than a predetermined level, and output means for selectively outputting the demodulated signal and the equalized signal.

According to a first aspect of the present invention, the demodulating means comprises a demodulator for converting the received signal into a baseband signal and demodulating the baseband signal by synchronizing with a carrier signal and a timing signal, the decision means comprises a decision circuit for determining the quality of the demodulated signal, a decision error estimator for estimating a decision error produced when the decision circuit determines the quality of the demodulated signal, and a signal quality decision circuit for determining the quality of the demodulated signal based on an output signal from the decision error estimator, the equalizing means comprises an equalizer selectively powered on and off by an output signal from the signal quality decision circuit, and the output means comprises a switch responsive to the output signal from the signal quality decision circuit for selectively outputting the demodulated signal and the equalized signal.

According to a second aspect of the present invention, the demodulating means comprises a demodulator for converting the received signal into a baseband signal and demodulating the baseband signal by synchronizing with a carrier signal and a timing signal, the decision means comprises a decision circuit for determining the quality of the demodulated Signal, an error detector for detecting an error of an output signal, partially or completely, from the decision circuit, and a signal quality decision circuit for determining the quality of the demodulated signal based on an output signal from the error detector, the equalizing means comprises an equalizer selectively powered on and off by an output signal from the signal quality decision circuit, and the output means comprises a switch responsive to the output signal from the signal quality decision circuit for selectively outputting the demodulated signal and the equalized signal.

According to a third aspect of the present invention, the demodulating means comprises a multiplier for converting the received signal into a baseband signal by multiplying the received signal by a carrier signal, and a sampler for sampling the baseband signal from the multiplier at predetermined sampling times, the decision means comprises a decision circuit for determining the quality of an output signal from the sampler, a decision error estimator for estimating a decision error produced when the decision circuit determines the quality of the output signal from the sampler, and a signal quality decision circuit for determining the quality of the output signal from the sampler based on an output signal from the decision error estimator, the equalizing means comprises an equalizer selectively powered on and off by an output signal from the signal quality decision circuit for outputting phase error information of the output signal from the sampler, and the output means comprises a first switch responsive to the output signal from the signal quality decision circuit for selectively outputting the output signal from the sampler and the equalized signal from the equalizer, the demodulating means further comprising a phase error detector for detecting a phase error of the received signal from the output signal from the sampler, a second switch responsive to the output signal from the signal quality decision circuit for selectively outputting an output signal from the phase error detector and the phase error information from the equalizer, and a phase-control oscillator controllable in 10 phase by an output signal from the second switch for outputting the carrier signal to the multiplier to control the phase of the received signal.

According to a fourth aspect of the present invention, the demodulating means comprises a multiplier for converting the received signal into a baseband signal by multiplying the received signal by a carrier signal, and a sampler for sampling the baseband signal from the multiplier at predetermined sampling times, the decision means comprises a decision circuit for determining the quality of an output signal from the sampler, an error detector for detecting an error of an output signal, partially or completely, from the decision circuit, and a signal quality decision circuit for determining the quality of the output signal from the sampler based on an output signal from the error detector, the equalizing means comprises an equalizer selectively energizable and de-energizable by an output signal from the signal quality decision circuit for outputting phase error information of the output signal from the sampler, and the output means comprises a first switch responsive to the output signal from the signal quality decision circuit for selectively outputting the output signal from the sampler and the equalized signal from the equalizer, the demodulating means further comprising a phase error detector for detecting a phase error of the received signal from the output signal from the sampler, a second switch responsive to the output signal from the signal quality decision circuit for selectively outputting an output signal from the phase error detector and the phase error information from the equalizer, and a phase-control oscillator controllable in phase by an output signal from the second switch for outputting the carrier signal to the multiplier to control the phase of the received signal.

According to a fifth aspect of the present invention, the demodulating means comprises a demodulator for converting the received signal into a baseband signal and sampling the baseband signal at predetermined sampling times, the decision means comprises a delay circuit for delaying an output signal from the demodulator by one symbol period, a phase error detector for detecting the difference in phase between the output signal from the demodulator and an output signal from the delay circuit, a decision circuit for determining the quality of an output signal from the phase error detector, a decision error estimator for estimating a decision error produced when the decision circuit determines the quality of the output signal from the phase error detector, and a signal quality decision circuit for determining the quality of the output signal from the demodulator based on an output signal from the decision error estimator, the equalizing means comprises an equalizer selectively powered on and off by an output signal from the signal quality decision circuit, and the output means comprises a first switch responsive to the output signal from the signal quality decision circuit for selectively outputting the output signal from the demodulator and the equalized signal from the equalizer, the demodulating means further comprising a timing extracting circuit for producing a timing signal indicative of the predetermined sampling times from the received signal, a clock generator for producing a timing signal indicative of the predetermined sampling times independently of the received signal, and a second switch responsive to the output signal from the signal quality decision circuit for selectively outputting the timing signal from the timing extracting circuit and the timing signal from the clock generator to the demodulator.

According to a sixth aspect of the present invention, the demodulating means comprises a demodulator for converting the received signal into a baseband signal and sampling the baseband signal at predetermined sampling times, the decision means comprises a delay circuit for delaying an output signal from the demodulator by one symbol period, a phase error detector for detecting the difference in phase between the output signal from the demodulator and an output signal from the delay circuit, a decision circuit for determining the quality of an output signal from the phase error detector, an error detector for detecting an error of an output signal, partially or completely, from the decision circuit, and a signal quality decision circuit for determining the quality of the output signal from the demodulator based on an output signal from the error detector, the equalizing means comprises an equalizer selectively powered on and off by an output signal from the signal quality decision circuit, and the output means comprises a first switch responsive to the output signal from the signal quality decision circuit for selectively outputting the output signal from the demodulator and the equalized signal from the equalizer, the demodulating means further comprising a timing extracting circuit for producing a timing signal indicative of the predetermined sampling times from the received signal, a clock generator for producing a timing signal indicative of the predetermined sampling times independently of the received signal, and a second switch responsive to the output signal from the signal quality decision circuit for selectively outputting the timing signal from the timing extracting circuit and the timing signal from the clock generator to the demodulator.

The above and other objects, features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
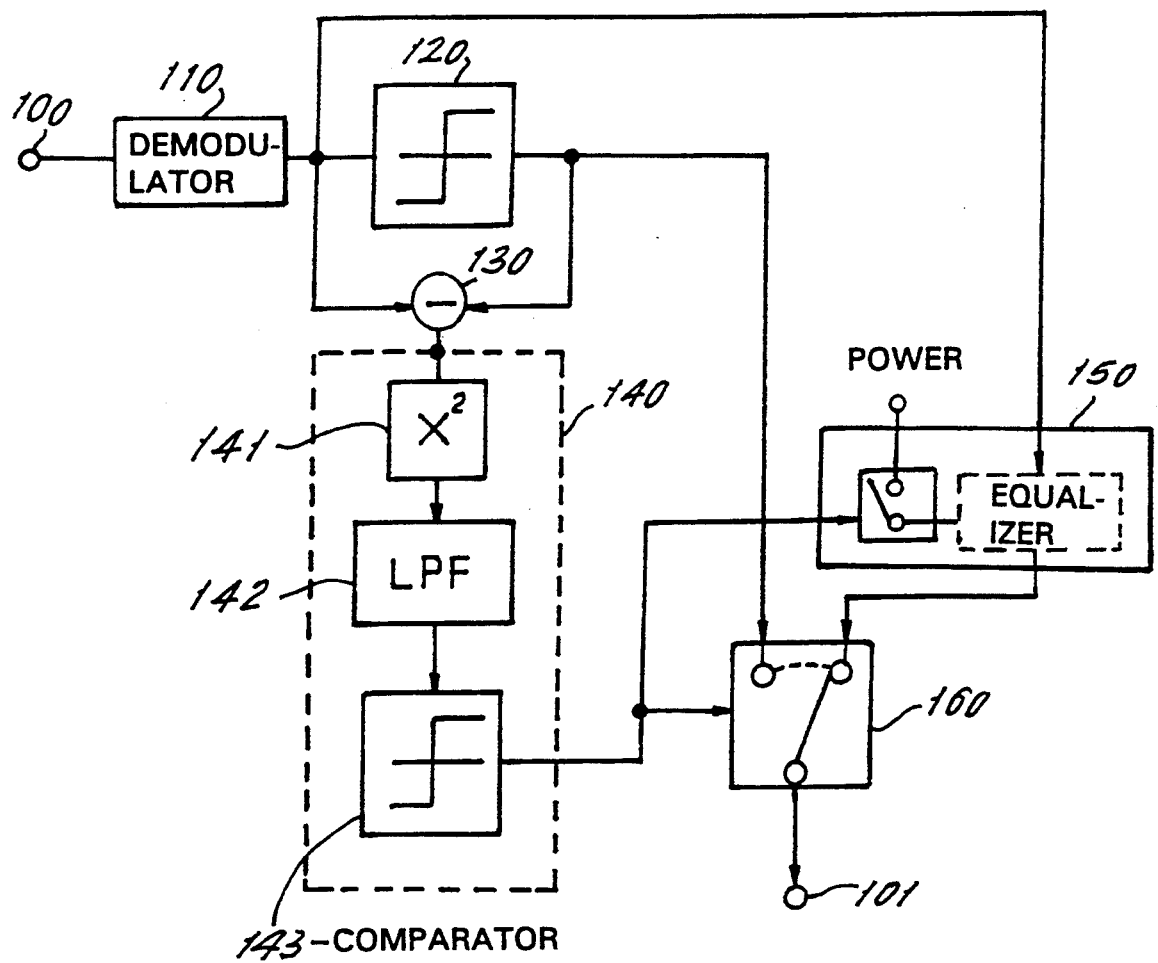
FIG. 1 is a block diagram of a receiver for digital mobile radio communication according to a first embodiment of the present invention.

FIG. 1 is a block diagram of a receiver for digital mobile radio communication according to a first embodiment of the present invention.

As shown in FIG. 1, a received signal supplied from input terminal 100 is converted into a baseband signal and demodulated by synchronizing with a carrier signal and a timing signal by demodulator 110. The demodulated signal from demodulator 110 is compared with a predetermined threshold by decision circuit 120. Decision error estimator 130 estimates an error in decision circuit 120 based on the difference between the input and output signals of decision unit 120. Signal quality decision circuit 140 has square circuit 141 for squaring the estimated error produced by decision error estimator 130, and low-pass filter 142 for integrating the squared error to estimate the quality of the signal. If low-pass filter 142 produces a larger output signal, then it is determined that the error of the decision circuit 120 is larger on the average, and if low-pass filter 142 produces a smaller output signal, then it is determined that the error of decision circuit 120 is smaller on the average. The output signal from low-pass filter 142 is compared with a predetermined threshold by comparator 143. If the output signal from low-pass filter 142 is larger than the predetermined threshold, then it is determined that the signal quality is poor. Conversely, if the output signal from low-pass filter 142 is smaller than the predetermined threshold, then it is determined that the signal quality is high.

Signal quality decision circuit 140 applies its 10 output signal, representative of the signal quality, to equalizer 150. When the signal quality as indicated by the output signal from signal quality decision circuit 140 is found to be poor, i.e., when the output signal from low-pass filter 142 is larger than the predetermined threshold, equalizer 150 is powered on to equalize the output signal from demodulator 110. The output signal from signal quality decision circuit 140 is also applied to switch 160. When the signal quality is poor and is so indicated by the output signal from signal quality decision circuit 140, switch 160 switches from the output signal of decision circuit 120 to the output signal of equalizer 150, and supplies the output signal from equalizer 150 to output terminal 101. When the signal quality is good and is so indicated by the output signal from signal quality decision unit 140, equalizer 150 is de-energized, and switch 160 supplies the output signal from decision unit 120 to output terminal 101.

Since equalizer 150 is powered on only when the signal quality is determined to be poor, power consumption of the receiver is reduced. Equalizer 150 may be any of various conventional circuits the present invention has no bearing on the circuit arrangement of equalizer 150 itself. Signal quality decision circuit 140 may be any of other known configurations. For example, square circuit 141 may be replaced with another nonlinear circuit such as a circuit for producing the absolute value of an input signal.

Figure 2:
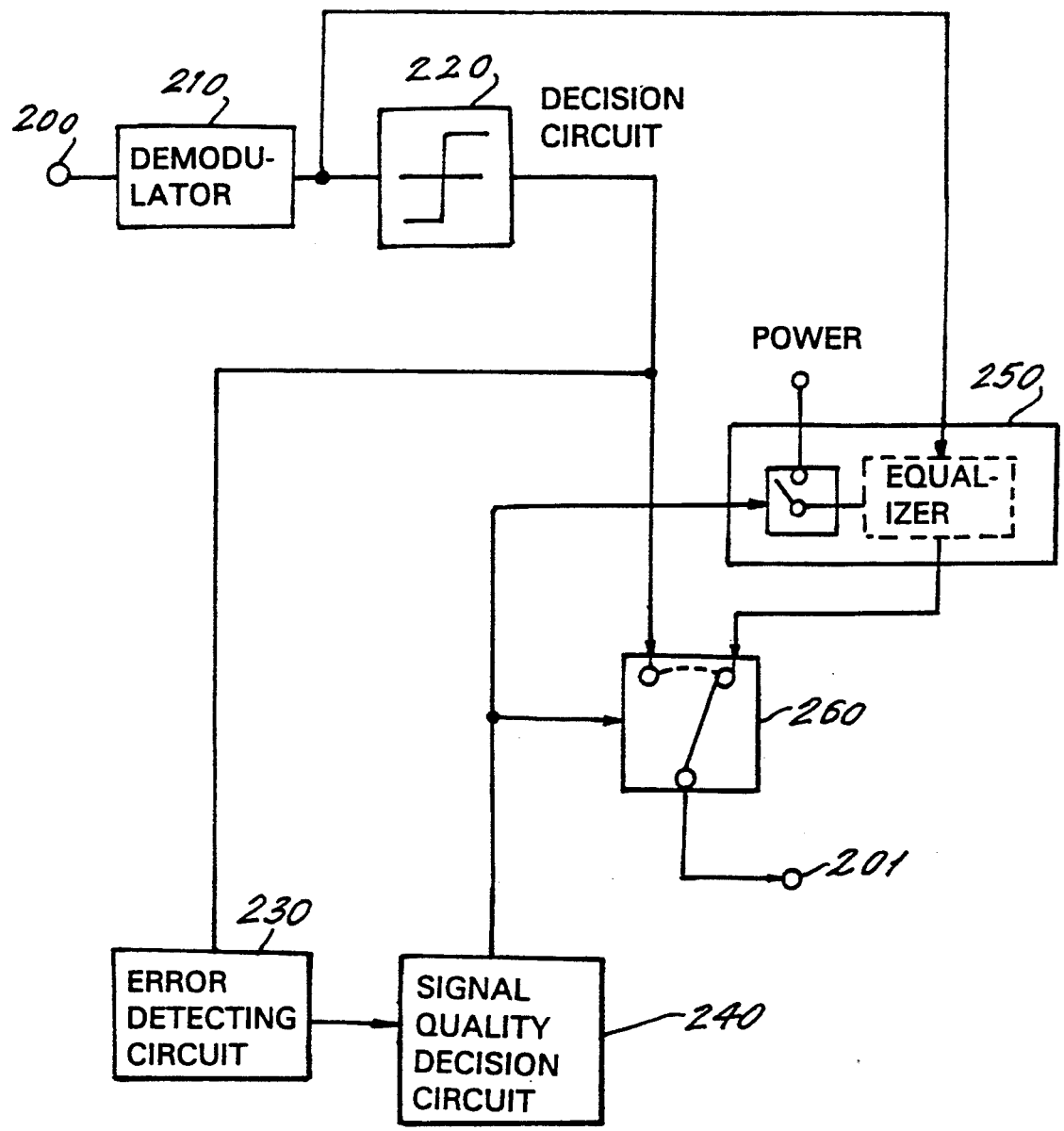
FIG. 2 is a block diagram of a receiver for digital mobile radio communication according to a second embodiment of the present invention.

FIG. 2 is a block diagram of a receiver for digital mobile radio communication according to a second embodiment of the present invention.

As shown in FIG. 2, a received signal supplied from input terminal 200 is demodulated by demodulator 210 into a baseband signal which is determined by decision unit 220. The output signal from demodulator 110 is also supplied to equalizer 250. Decision circuit 220 supplies its output signal to error detecting circuit 230 and switch 260. Error detecting circuit 230 detects whether the supplied signal has an error or not, and applies an output signal indicative of detected errors to signal quality decision circuit 240. Signal quality decision circuit 240 counts detected errors within a predetermined period of time. If the count of the number of errors within the predetermined period of time is equal to or greater than a predetermined value, then signal quality decision circuit 240 produces a control signal for powering on equalizer 250 and shifting switch 260 to the output terminal of equalizer 250. When equalizer 250 is powered on, it equalizes the output signal from demodulator 210, and supplies an equalized signal to switch 260. Switch 260 supplies either the output signal from decision circuit 220 or the output signal from equalizer 250, depending on the output signal from signal quality decision circuit 240, to output terminal 201. When the number of errors as determined by signal quality decision circuit 240 is reduced to fewer than the predetermined value, signal quality decision circuit 240 produces another control signal to power off equalizer 250. Error detecting circuit 230 may be any of various known circuit configurations depending on a signal series transmitted to the receiver.

Figure 3:
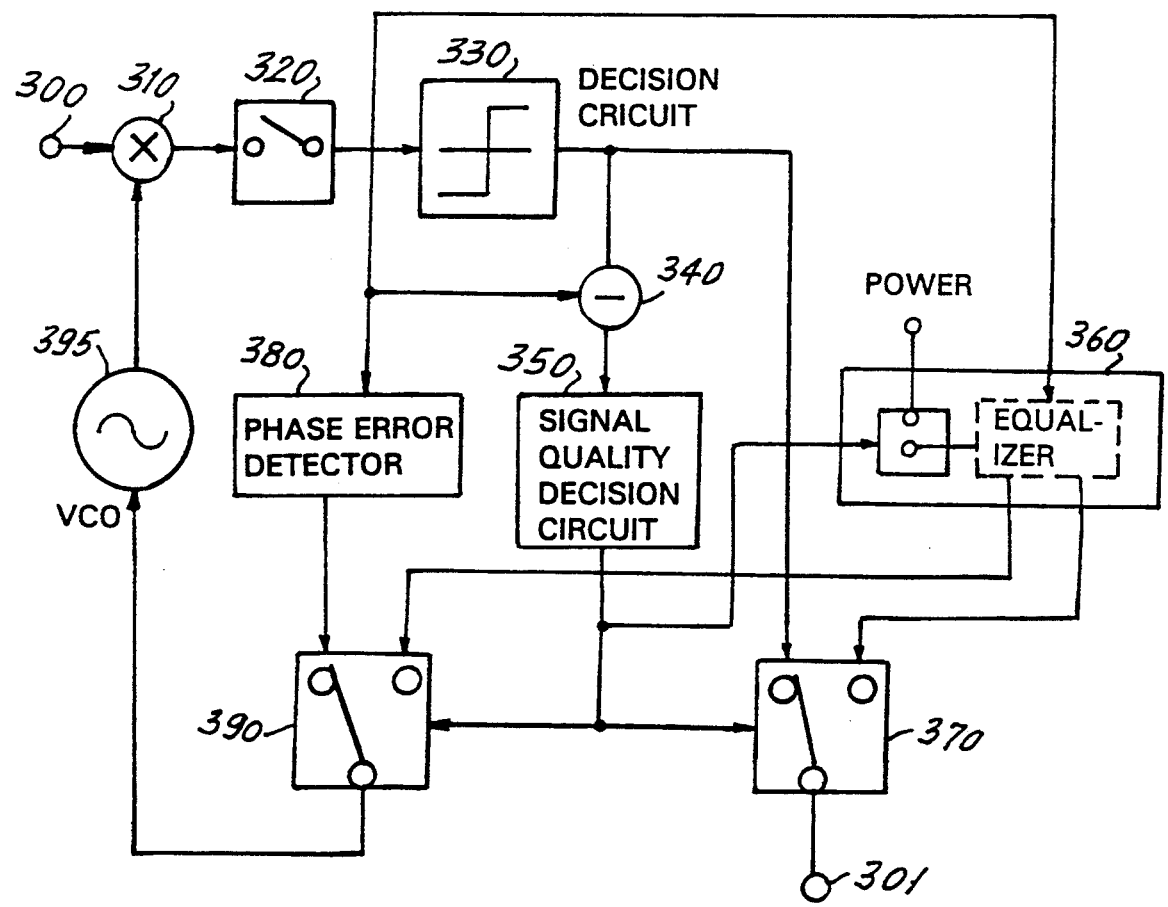
FIG. 3 is a block diagram of a receiver for digital mobile radio communication according to a third embodiment of the present invention.

FIG. 3 is a block diagram of a receiver for digital mobile radio communication according to a third embodiment of the present invention.

As shown in FIG. 3, a received signal supplied from input terminal 300 is converted into a baseband signal by multiplier 310 which multiplies the received signal by a phase control carrier signal from phase-control oscillator (VCO) 395. The output baseband signal from multiplier 310 is sampled at suitable times by sampler 320. Sampler 320 applies a sampled output signal to decision circuit 330 which compares the sampled output signal with a predetermined threshold. Decision error estimator 340 estimates an error in decision circuit 330 based on the difference between input and output signals of decision circuit 330. Signal quality decision circuit 350, which is of an arrangement identical to that of signal quality decision circuit 130 shown in FIG. 1, determines the quality of the signal. Signal quality decision circuit 350 applies its output signal, representative of the signal quality, to equalizer 360. When the signal quality indicated by the output signal from signal quality decision circuit 350 is found to be poor, equalizer 360 is powered on to equalize the output signal from sampler 320. The output signal from the signal quality decision circuit 350 is also applied to first and second switches 370, 390. When the signal quality is poor, indicated by the output signal from signal quality decision circuit 350, first switch 370 switches from the output signal of decision circuit 330 to the output signal of equalizer 360, and supplies the output signal from equalizer 360 to output terminal 301. When the signal quality improves and is so indicated by the output signal from signal quality decision circuit 350, equalizer 350 is de-energized, and first switch 370 supplies the output signal from decision unit 330 to output terminal 301. Inasmuch as equalizer 360 is energized only when the signal quality is determined as being poor, power consumption of the receiver is reduced.

VCO 395 which is normally used for demodulation effects phase control for absorbing frequency and phase deflections of the transmitter. Phase control information used for phase control by VCO 395 is produced by phase error detector 380 which effects statistical processing on the output signal from sampler 320. When any intersymbol interference of the received signal is small, the output signal from phase error detector 380 can be applied to VCO 395 for controlling the phase of the signal in VCO 395. However, when the intersymbol interference increases significantly, the phase error cannot be detected properly with the output signal from phase error detector 380 being applied to VCO 395. According to the embodiment shown in FIG. 3, in the event that the signal quality is lowered, VCO 395 is supplied with a control signal, indicative of phase error information, from equalizer 360 through second switch 390. Second switch 390 is controlled by the output signal from signal quality decision circuit 350 to selectively supply the output signals from phase error detector 380 and equalizer 360 to VCO 395 by synchronizing with de-energization and energization of equalizer 360. Consequently, VCO 395 can continuously effect phase control even if the intersymbol interference increases.

Figure 4:
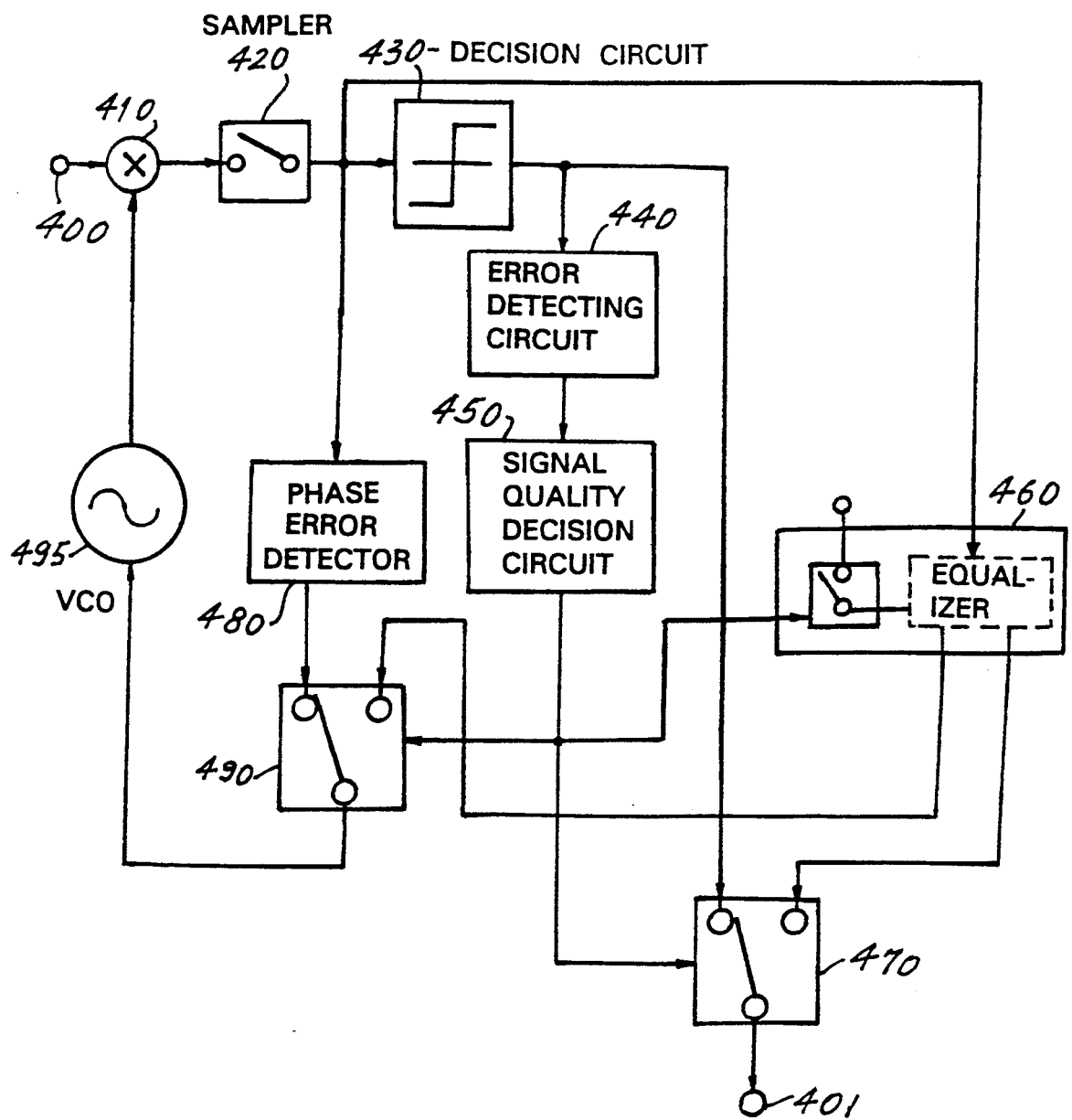
FIG. 4 is a block diagram of a receiver for digital mobile radio communication according to a fourth embodiment of the present invention.

FIG. 4 is a block diagram of a receiver for digital mobile radio communication according to a fourth embodiment of the present invention.

As shown in FIG. 4, a received signal supplied from input terminal 400 is converted into a baseband signal by multiplier 410 which multiplies the received signal by a phase controlled carrier signal from voltage-control oscillator (VCO) 495. The output baseband signal from multiplier 410 is sampled at suitable periods by sampler 420. Sampler 420 applies a sampled output signal to decision circuit 430 which compares the sampled output signal with a predetermined threshold. Error detecting circuit 440 detects an error in the output signal from decision unit 430, and applies an output signal indicative of the detected error to signal quality decision circuit 450. Signal quality decision circuit 450 counts errors in a predetermined period. If the count is equal to or higher than a predetermined value, signal quality decision unit 450 produces a control signal that powers on equalizer 460 and shifts first switch 470 to apply an output signal from equalizer 460 to output terminal 401. When equalizer 460 is energized, it equalizes the output signal from sampler 420. At the same time, equalizer 460 detects a phase error, and applies an output signal indicative of the detected phase error to second switch 490. When the signal quality improves and is so indicated by the output signal from signal quality decision circuit 450, equalizer 460 is powered off, and first switch 470 is shifted back to supply the output signal from decision circuit 430 to output terminal 401. Inasmuch as equalizer 460 is powered on only when the signal quality is determined to be poor, power consumption of the receiver is suppressed.

VCO 495 which is normally used for demodulation effects phase control for absorbing frequency and phase deflections of a transmitter. Phase control information used for phase control by VCO 495 is produced by phase error detector 480 which effects statistical processing on the output signal from sampler 420. When any intersymbol interference of the received signal is small, the output signal from phase error detector 480 can be applied to VCO 495 for controlling the phase of the signal in VCO 495. However, when the intersymbol interference increases significantly, the phase error cannot be detected properly with the output signal from phase error detector 480 being applied to VCO 495. According to the embodiment shown in FIG. 4, in the event that the signal quality is lowered, VCO 495 is supplied with a control signal, indicative of phase error information, from equalizer 460 through second switch 490. Second switch 490 is controlled by the output signal from signal quality decision circuit 450 to selectively supply the output signals from phase error detector 480 and equalizer 460 to VCO 495 by synchronizing with energization of equalizer 460. Consequently, VCO 495 can continuously effect phase control even if the intersymbol interference increases.

Figure 5:
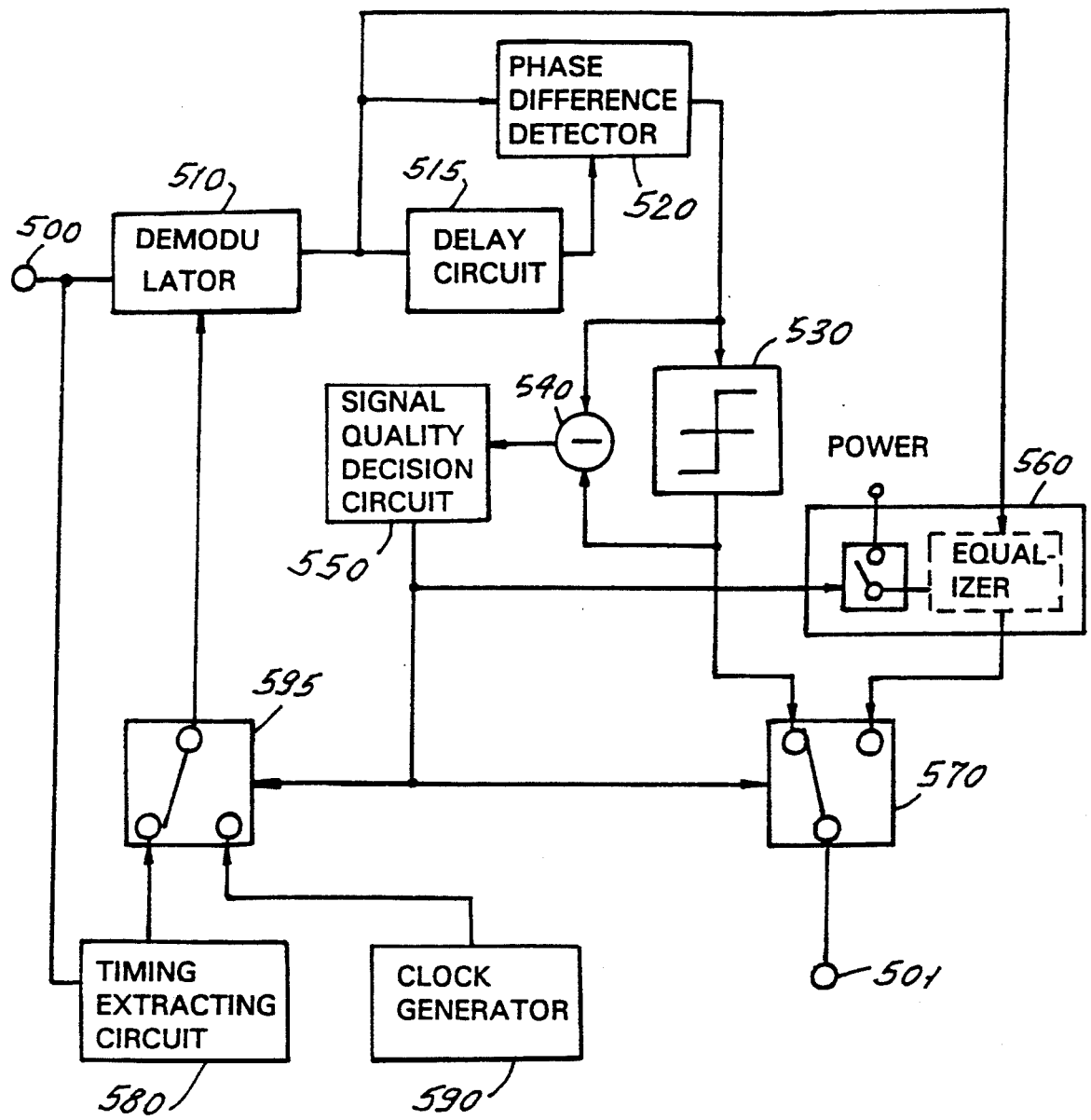
FIG. 5 is a block diagram of a receiver for digital mobile radio communication according to a sixth embodiment of the present invention.

FIG. 5 is a block diagram of a receiver for digital mobile radio communication according to a fifth embodiment of the present invention.

As shown in FIG. 5, a received signal supplied from input terminal 500 is converted into a baseband signal and sampled based on a timing signal supplied from second switch 595, by demodulator 510. The output signal from demodulator 510 is delayed by one symbol period by delay circuit 515. The difference in phase between the output signal from demodulator 510 and the output signal from delay circuit 515 is detected by phase difference detector 520. A differential detection is performed by comparing the phase difference with a predetermined threshold at decision circuit 530. Decision error estimator 540 estimates an error in decision circuit 530 based on the difference between the input and output signals of decision circuit 530. Signal quality decision circuit 550 determines the quality of the signal based on an output signal from decision error estimator 540. Signal quality decision circuit 550 applies its output signal, representative of the signal quality, to equalizer 560. When the signal quality indicated by the output signal from signal quality decision circuit 550 is found poor, equalizer 560 is energized to equalize the output signal from demodulator 510. When the signal quality is improved, equalizer 560 is powered off. The output signal from signal quality decision circuit 550 is also applied to first switch 570. When the signal quality is poor as indicated by the output signal from signal quality decision circuit 550, first switch 570 switches from the output signal of decision circuit 530 to the output signal of equalizer 560, and supplies the output signal from equalizer 560 to output terminal 501. When the signal quality improves and is so indicated by the output signal from signal quality decision circuit 550, equalizer 560 is de-energized, and first switch 570 supplies the output signal from decision circuit 530 to output terminal 501. The receiver requires little power because equalizer 560 is energized only when the signal quality is determined to be poor.

The baseband signal is sampled by demodulator 510 at sampling times which are normally determined by the timing signal that is produced from the received signal by timing extracting circuit 580 and supplied from second switch 595. When the intersymbol interference increases significantly, however, it is difficult for timing extracting circuit 580 to extract the timing signal correctly, and the extracted timing signal tends to fluctuate, making equalizer 560 unstable in operation. To avoid the above drawback, if the signal quality is found to be poor as indicated by the output signal from signal quality decision circuit 550, for thereby energizing equalizer 560, then second switch 595 is shifted to prevent the output signal of timing extracting circuit 580 from being supplied as the timing signal to demodulator 510, and to allow a clock signal generated by clock generator 590 to be supplied as the timing signal to demodulator 510. In this manner, the timing signal is prevented from fluctuating unduly, permitting equalizer 560 to operate stably. It is known that a double-sampling equalizer for equalizing a received signal that has been sampled at a rate which is twice the symbol rate has good equalizing characteristics irrespective of the sampling timing. Such a double-sampling equalizer can be realized when the clock speed of clock generator 590 is set to a rate twice the symbol rate.

Figure 6:
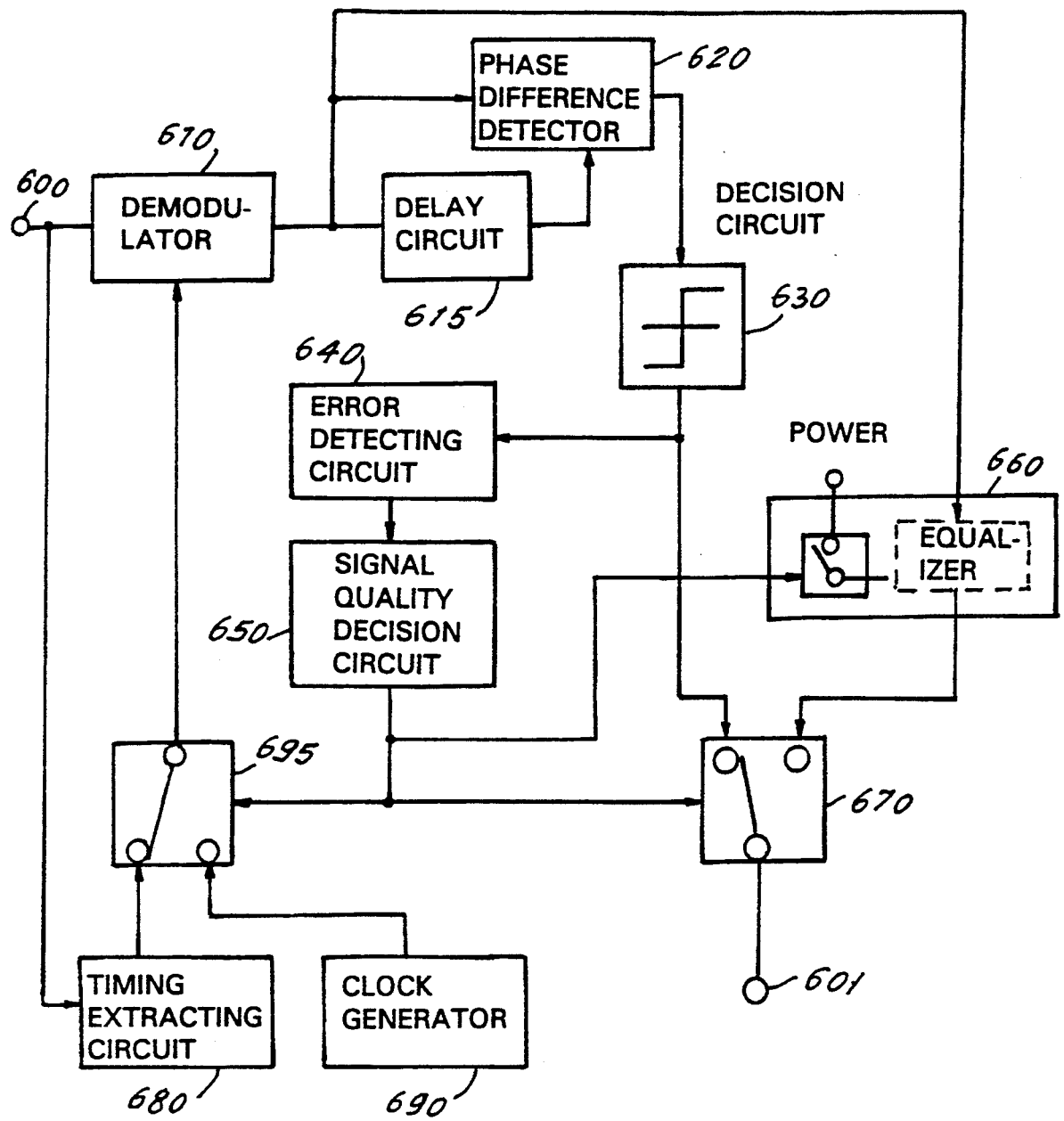
FIG. 6 is a block diagram of a receiver for digital mobile radio communication according to a seventh embodiment of the present invention.

FIG. 6 is a block diagram of a receiver for digital mobile radio communication according to a sixth embodiment of the present invention.

As shown in FIG. 6, a received signal supplied from input terminal 600 is converted into a baseband signal and sampled based on a timing signal supplied from second switch 695, by demodulator 610. The output signal from demodulator 610 is delayed by one symbol time by delay circuit 615. The difference in phase between the output signal from demodulator 610 and the output signal from delay circuit 615 is detected by phase difference detector 620. Differential detection is performed by comparing the phase difference with a predetermined threshold at decision circuit 630. Error detecting circuit 640 detects an error in the output signal from decision circuit 630, and applies an output signal indicative of the detected error to signal quality decision unit 650. Signal quality decision circuit 650 counts errors in a predetermined period of time for determining the quality of the signal. Signal quality decision circuit 650 applies its output signal, representative of the signal quality, to equalizer 660. When the signal quality as indicated by the output signal from signal quality decision circuit 650 is found to be poor, equalizer 660 is energized to equalize the output signal from demodulator 610. When the signal quality is improved, equalizer 660 is de-energized. The output signal from signal quality decision circuit 650 is also applied to first switch 670. When the signal quality is poor and is so indicated by the output signal from signal quality decision circuit 650, first switch 670 switches from the output signal of decision circuit 630 to the output signal of equalizer 660, and supplies the output signal from equalizer 660 to output terminal 601. When the signal quality improves and so indicated by the output signal from signal quality decision circuit 650, equalizer 660 is de-energized, and first switch 670 supplies the output signal from decision circuit 630 to output terminal 601. Thus, the receiver requires little power requirement because equalizer 660 is energized only when the signal quality is determined to be poor.

The baseband signal is sampled by demodulator 610 at sampling period which are normally determined by the timing signal that is produced from the received signal by timing extracting circuit 680 and supplied from second switch 695. When the intersymbol interference increases significantly, however, it is difficult for timing extracting circuit 680 to extract the timing signal correctly, and the extracted timing signal tends to fluctuate, making equalizer 660 unstable in operation. To avoid the above drawback, if the signal quality is found to be poor as indicated by the output signal from signal quality decision circuit 650, for thereby energizing equalizer 660, then second switch 695 is shifted to prevent the output signal of timing extracting circuit 680 from being supplied as the timing signal to demodulator 610, and to allow a clock signal generated by clock generator 690 to be supplied as the timing signal to demodulator 610. In this manner, the timing signal is prevented from fluctuating unduly, permitting equalizer 660 to operate stably. It is known that a double-sampling equalizer for equalizing a received signal that has been sampled at a rate which is twice the symbol rate has good equalizing characteristics irrespective of the sampling timing. Such a double-sampling equalizer can be realized when the clock speed of clock generator 690 is set to a rate twice the symbol rate.

Although certain preferred embodiments of the present invention have been shown and described in detail, it should be understood that various changes and modifications may be made therein without departing from the scope of the appended claims.

We claim:

1. A receiver for digital radio communications, comprising:
   demodulating means for demodulating a received signal;
   decision means for determining the quality of the demodulated signal;
   equalizing means for equalizing the demodulated signal when the quality of the demodulated signal is lower than a predetermined level;
   means for supplying power;
   switching means for connecting the power supplying means to the equalizing means when the quality of the demodulated signal is lower than a predetermined level and for disconnecting the power supplying means from the equalizing means when the quality of the demodulated signal is above the predetermined level; and
   output means for selectively outputting the demodulated signal and the equalized signal.

2. A receiver according to claim 1, wherein said demodulating means comprises a demodulator for converting the received signal into a baseband signal and demodulating the baseband signal by synchronizing with a carrier signal and a timing signal, said decision means comprises a decision circuit for determining the quality of the demodulated signal, a decision error estimator for estimating a decision error produced when said decision circuit determines the quality of the demodulated signal, and a signal quality decision circuit for determining the quality of the demodulated signal based on an output signal from said decision error estimator, said switching means is selectively energizable by an output signal from said signal quality decision circuit, and said output means comprises a switch responsive to the output signal from said signal quality decision circuit for selectively outputting the demodulated signal and the equalized signal.

3. A receiver according to claim 1, wherein said demodulating means comprises a demodulator for converting the received signal into a baseband signal and demodulating the baseband signal by synchronizing, with a carrier signal and a timing signal, said decision means comprises a decision circuit for determining the quality of the demodulated signal, an error detector for detecting an error of an output signal, partially or completely, from said decision circuit, and a signal quality decision unit for determining the quality of the demodulated signal based on an output signal from said error detector, said switching means is selectively energizable by an output signal from said signal quality decision circuit, and said output means comprises a switch responsive to the output signal from said signal quality decision circuit for selectively outputting the demodulated signal and the equalized signal.

4. A receiver according to claim 1, wherein said demodulating means comprises a multiplier for converting the received signal into a baseband signal by multiplying the received signal by a carrier signal, and a sampler for sampling the baseband signal from said multiplier at predetermined sampling times, said decision means comprises a decision circuit for determining the quality of an output signal from said sampler, a decision error estimator for estimating a decision error produced when said decision circuit determines the quality of the output signal from said sampler, and a signal quality decision circuit for determining the quality of the output signal from said sampler based on an output signal from said decision error estimator, said switching means is selectively switched on and off by an output signal from said signal quality decision circuit for outputting phase error information of the output signal from said sampler, and said output means comprises a first switch responsive to the output signal from said signal quality decision circuit for selectively outputting the output signal from said sampler and the equalized signal from said equalizer, said demodulating means further comprising a phase error detector for detecting a phase error of the received signal from the output signal from said sampler, a second switch responsive to the output signal from said signal quality decision circuit for selectively outputting an output signal from said phase error detector and the phase error information from said equalizer, and a phase-control oscillator controllable in phase by an output signal from said second switch for outputting the carrier signal to said multiplier to control the phase of the received signal.

5. A receiver according to claim 1, wherein said demodulating means comprises a multiplier for converting the received signal into a baseband signal by multiplying the received signal by a carrier signal, and a sampler for sampling the baseband signal from said multiplier at predetermined sampling times, said decision means comprises a decision circuit for determining the quality of an output signal from said sampler, an error detector for detecting an error of an output signal, partially or completely, from said decision circuit, and a signal quality decision circuit for determining the quality of the output signal from said sampler based on an output signal from said error detector, said switching means is selectively energizable by an output signal from said signal quality decision circuit for outputting phase error information of the output signal from said sampler, and said output means comprises a first switch responsive to the output signal from said signal quality decision unit for selectively outputting the output signal from said sampler and the equalized signal from said equalizer, said demodulating means further comprising a phase error detector for detecting a phase error of the received signal from the output signal from said sampler, a second switch responsive to the output signal from said signal quality decision circuit for selectively outputting an output signal from said phase error detector and the phase error information from said equalizer, and a phase-control oscillator controllable in phase by an output signal from said second switch for outputting the carrier signal to said multiplier to control the phase of the received signal.

6. A receiver according to claim 1, wherein said demodulating means comprises a demodulator for converting the received signal into a baseband signal and sampling the baseband signal at predetermined sampling times, said decision means comprises a delay circuit for delaying an output signal from said demodulator by one symbol period, a phase error detector for detecting the difference in phase between the output signal from said demodulator and an output signal from said delay circuit, a decision circuit for determining the quality of an output signal from said phase error detector, a decision error estimator for estimating a decision error produced when said decision circuit determines the quality of the output signal from said phase error detector, and a signal quality decision circuit for determining the quality of the output signal from said demodulator based on an output signal from said decision error estimator, said switching means is selectively switched on and off by an output signal from said signal quality decision circuit, and said output means comprises a first switch responsive to the output signal from said signal quality decision circuit for selectively outputting the output signal from said demodulator and the equalized signal from said equalizer, said demodulating means further comprising a timing extracting circuit for producing a timing signal indicative of said predetermined sampling times from said received signal, a clock generator for producing a timing signal indicative of said predetermined sampling times independently of said received signal, and a second switch responsive to the output signal from said signal quality decision circuit for selectively outputting the timing signal from said timing extracting circuit and the timing signal from said clock generator to said demodulator.

7. A receiver according to claim 1, wherein said demodulating means comprises a demodulator for converting the received signal into a baseband signal and sampling the baseband signal at predetermined sampling times, said decision means comprises a delay circuit for delaying an output signal from said demodulator by one symbol period, a phase error detector for detecting the difference in phase between the output signal from said demodulator and an output signal from said delay circuit, a decision circuit for determining the quality of an output signal from said phase error detector, an error detector for detecting an error of an output signal, partially or completely, from said decision circuit, and a signal quality decision circuit for determining the quality of the output signal from said demodulator based on an output signal from said error detector, said switching means is selectively switched on and off by an output signal from said signal quality decision circuit, and said output means comprises a first switch responsive to the output signal from said signal quality decision unit for selectively outputting the output signal from said demodulator and the equalized signal from said equalizer, said demodulating means further comprising a timing extracting circuit for producing a timing signal indicative of said predetermined sampling times from said received signal, a clock generator for producing a timing signal indicative of said predetermined sampling times independently of said received signal, and a second switch responsive to the output signal from said signal quality decision circuit for selectively outputting the timing signal from said timing extracting circuit and the timing signal from said clock generator to said demodulator.

* * * * *